Dec. 4, 1951     T. MIDLAND     2,577,143
COMBINED FISHLINE SINKER AND HOOK SPREADER
Filed June 5, 1948
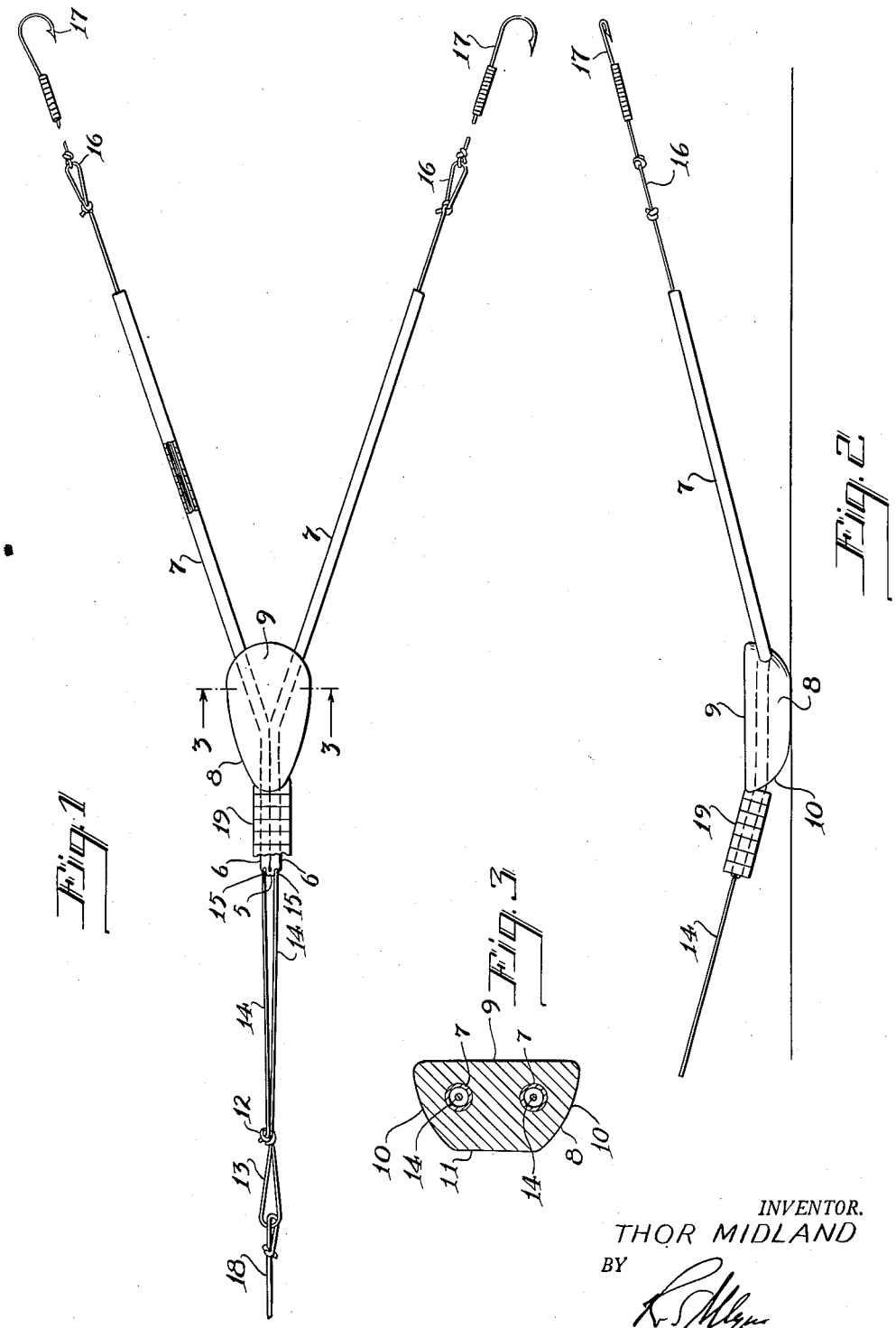
INVENTOR.
THOR MIDLAND
BY
ATTORNEY Patented Dec. 4, 1951

2,577,143

UNITED STATES PATENT OFFICE 2,577,143

COMBINED FISHLINE SINKER AND HOOK SPREADER

Thor Midland, Brooklyn, N. Y.

Application June 5, 1948, Serial No. 31,280

4 Claims. (Cl. 43—42.74)

This invention relates to fishing tackle and more particularly to a combined fish line sinker and hook spreader.

In under surface or bottom fishing, difficulty has been experienced in sinking the hooks to the bottom and in moving the sinker and hooks along the bottom. Also when more than one hook is used, the hooks often become entangled with each other or with the line.

It is a prime object of the present invention to overcome these difficulties.

Another object is to provide a simple and effective means for spreading the hooks apart.

A further object is to provide means for facilitating movement of the fishing tackle along the bottom.

Still another object is to provide means for protecting the points of the hooks when the device is not in use.

Yet another object is to provide a device of this kind that permits a sensitive connection between the hook and line.

Other advantages of the invention will be apparent from the description thereof to follow taken in connection with the accompanying drawing in which—

Fig. 1 is a top plan view of a combined fish line sinker and hook spreader embodying my invention, parts being broken away.

Fig. 2 is a side view thereof.

Fig. 3 is an enlarged cross-sectional view taken on the plane of the line 3—3 of Fig. 1.

As shown, an elongated metal tube is bent upon itself, midway its ends, as indicated at 5 and pressed together thereby forming separate juxtaposed, rigid tubular portions 6, 6 for a short distance from said bend. The tubular portions then diverge outwardly and upwardly from each other to form diverging tubular arms 7, 7.

A weighted body or sinker 8 of lead is molded or cast around the juncture of the juxtaposed portions 6, 6 and the arms 7, 7 leaving said portions and arms projecting from the ends of the body 8. The sinker is preferably oval-shaped in plan and has a flat top surface 9 and side wall 10 curving inwardly and downwardly and terminating in a flat bottom surface 11 of smaller area than the top surface as viewed in Figs. 1 and 3. The flat bottom surface permits the sinker to rest upright on the bottom and the curved walls offer a minimum of resistance when the tackle is dragged along the bottom. The portions of the tubular members embedded in the weighted body 8 extend in a plane approximately parallel to the planes of the flat surfaces of said weighted body.

A leader or snell of cat gut or similar material is knotted midway its ends as indicated at 12 to form a looped end 13. The free ends 14, 14 of the leader pass through holes 15 formed in the ends of the juxtaposed tubular portions 6, 6 and into and through said tubular portions and diverging arms 7, 7. A snell 16 supporting a hook 17 is fastened to the outer end of each free end of the leader. The looped end of the leader is fastened to a line 18 in the usual manner. Instead of a single leader, a pair of leaders may of course be used.

The leader ends 14, 14 slide independently and freely through the tubular portions 6, 6 and arms 7, 7 permitting longitudinal movement of the fish hooks. Accordingly the nibble of the fish will be transmitted to the fish line directly without having to disturb the sinker so that the fisherman has a very sensitive communication directly to the hooks.

The diverging arms 7, 7 keep the hooks spread apart thereby preventing entanglement.

Rubber rings 19 may be provided around the projecting tubular portions 6, 6 so that the pointed barbs of the hooks 17 may be embedded therein and therebetween when they are not in use. An elongated rubber or cork sleeve may be provided in place of the rings if desired. However, it has been found in practice that the rings can easily be separated and the barbs readily hooked around the edges thereof.

It will be understood that instead of a single metal tube bent upon itself to provide separate tubular portions, a pair of tubes properly shaped may be used.

I claim:

1. A combined fish line sinker and hook spreader comprising two rigid tubular members placed side by side for a portion of their length and diverging outwardly and upwardly from each other for the remainder of their length, a leader independently slidable in each tubular member and having a fish hook secured to one end thereof and a weighted body fastened around said tubular members at the juncture between the side by side and diverging portions of the tubular members.

2. A combined fish line sinker and hook spreader comprising two tubular members placed side by side for a portion of their length and spread apart for the remainder of their length, a leader independently slidable in each tubular member and having a fish hook secured to one end thereof and a weighted body fastened around said tubular members, said body having a flat top surface, sides curving inwardly from said top surface, and a flat bottom surface of smaller area than the top surface, portions of said tubular members extending in a plane approximately parallel to the planes of the flat surfaces of the weighted body.

3. A combined fish line sinker and hook spreader comprising two rigid tubular members placed side by side for a portion of their length and spread apart for the remainder of their length, a leader independently slidable in each tubular member and having a fish hook secured to one end thereof, a weighted body fastened around said tubular members at the juncture between their side by side and spread apart portions, and a flexible ring member around the juxtaposed portions of said tubular members adjacent the weighted body for receiving the barbed end of a fish hook.

4. A fishing tackle of the kind described comprising two tubular members in juxtaposed relation for a portion of their length and diverging outwardly and upwardly from each other for the remainder of their length, a lead sinker molded around said tubular members at the juncture between the juxtaposed and diverging portions thereof, a leader loosely passing through each of said tubular members, a snell supporting a fish hook fastened to one end of each of said leaders, a line fastened to the other ends of said leaders, and flexible ring members positioned around the juxtaposed portions of the tubular members.

THOR MIDLAND.

REFERENCES CITED

The following references are of record in the file of this patent:

UNITED STATES PATENTS

| Number | Name | Date |
|---|---|---|
| 396,246 | Vom Hofe | Jan. 15, 1889 |
| 653,020 | Fiers | July 3, 1900 |
| 790,336 | Yoerger | May 23, 1905 |
| 987,522 | Williams | Mar. 21, 1911 |
| 1,251,810 | Oehler | Jan. 1, 1918 |
| 1,352,979 | Lawrence | Sept. 14, 1920 |
| 2,086,457 | Zielesch | July 6, 1937 |
| 2,201,351 | Skoverski | May 21, 1940 |
| 2,225,309 | Lawrence | Dec. 17, 1940 |
| 2,231,616 | Costantino | Feb. 11, 1941 |
| 2,303,753 | Merle | Dec. 1, 1942 |